(12) United States Patent
Peng

(10) Patent No.: US 8,316,762 B2
(45) Date of Patent: Nov. 27, 2012

(54) JUICE EXTRACTORS

(75) Inventor: Weijie Peng, Guangdong Province (CN)

(73) Assignee: Weihua Peng, Shenzhen (CN)

( * ) Notice: Subject to any disclaimer, the term of this patent is extended or adjusted under 35 U.S.C. 154(b) by 816 days.

(21) Appl. No.: 12/437,896

(22) Filed: May 8, 2009

(65) Prior Publication Data

US 2010/0258012 A1 Oct. 14, 2010

Related U.S. Application Data

(63) Continuation of application No. PCT/CN2009/071213, filed on Apr. 9, 2009.

(51) Int. Cl.
*A23N 1/02* (2006.01)
*A47J 19/02* (2006.01)

(52) U.S. Cl. .............. 99/513; 99/510; 99/511; 541/37.5; 541/92

(58) Field of Classification Search .................... 99/513, 99/511, 510; 241/37.5, 92, 282.2, 282.1; 366/314, 601

See application file for complete search history.

(56) References Cited

U.S. PATENT DOCUMENTS

| | | | | |
|---|---|---|---|---|
| 2,527,695 A * | 10/1950 | Bennett | ...................... | 99/511 |
| 5,031,522 A * | 7/1991 | Brixel et al. | ................... | 99/511 |
| 5,193,448 A * | 3/1993 | Antonio | ........................ | 99/512 |
| 5,613,430 A * | 3/1997 | Lee | ............................... | 99/510 |
| 5,924,357 A * | 7/1999 | Chen | ............................ | 99/511 |
| 6,604,455 B2 * | 8/2003 | Areh et al. | ..................... | 99/510 |
| 2008/0173189 A1 * | 7/2008 | Gonneaud et al. | ............. | 99/511 |
| 2008/0202355 A1 * | 8/2008 | Krall et al. | ..................... | 99/513 |

* cited by examiner

*Primary Examiner* — Reginald L Alexander
(74) *Attorney, Agent, or Firm* — Leason Ellis LLP

(57) ABSTRACT

A juice extractor comprises a body, a filtering apparatus, and a shattering apparatus. The body has an inner space. The filtering apparatus is disposed within the body and divides the inner space into a shattering chamber and a collecting chamber. The shattering apparatus is disposed within the shattering chamber and comprises at least a first cutting blade and a second cutting blade configured to shatter a comestible. The comestibles shattered by the first cutting blade can reach the second cutting blade and be shattered by the second cutting blade.

20 Claims, 4 Drawing Sheets

JUICE EXTRACTORS

This patent application is a continuation of from Application Serial No. PCT/CN2009/071213, filed on Apr. 9, 2009, entitled "Juice Extractors," which is hereby incorporated by reference in its entirety herein.

TECHNICAL FIELD

The present application generally relates to the field of home appliance, more particularly to a device processing comestibles.

TECHNICAL BACKGROUND

As known to those who skilled in the art, a conventional juice extractor comprises a filter, a driving motor and a cutter driven by the driving motor. Fruits or vegetables are first shattered by the cutter and then filtered by a sieve like a filter, and juice of fruits or the vegetables can then be separated from the residue. However, most of the traditional juice extractors have a relatively low extracting rate. As such, it has been a need in the art to provide a juice extractor with an improved performance.

SUMMARY

In one aspect, provided is a juice extractor, which comprises a body, a filtering apparatus, and a shattering apparatus. The body has an inner space. The filtering apparatus is disposed within the inner space and defining a shattering chamber therein. The shattering apparatus is disposed within the shattering chamber and comprises at least a first cutting blade and a second cutting blade configured to shatter a comestible. Comestibles shattered by the first cutting blade can reach the second cutting blade and be shattered by the second cutting blade.

In another aspect, provided is a juice extractor, which comprises a body, a filtering apparatus, a shattering apparatus and a cover assembly. The body has an inner space. The filtering apparatus is disposed within the inner space and defining a shattering chamber therein. The shattering apparatus is disposed within the shattering chamber and comprises a first cutting blade and a third cutting blade configured to shatter comestibles. The cover assembly includes a second lower cover disposed above the third cutting blade. An outer lip is extended from a lower edge of the second lower cover in a horizontal direction so as to define a passage between the outer lip and the third cutting blade. The comestibles shattered by the first cutting blade can pass through the passage and be shattered by the third cutting blade.

DETAILED DESCRIPTION

Figure 1:
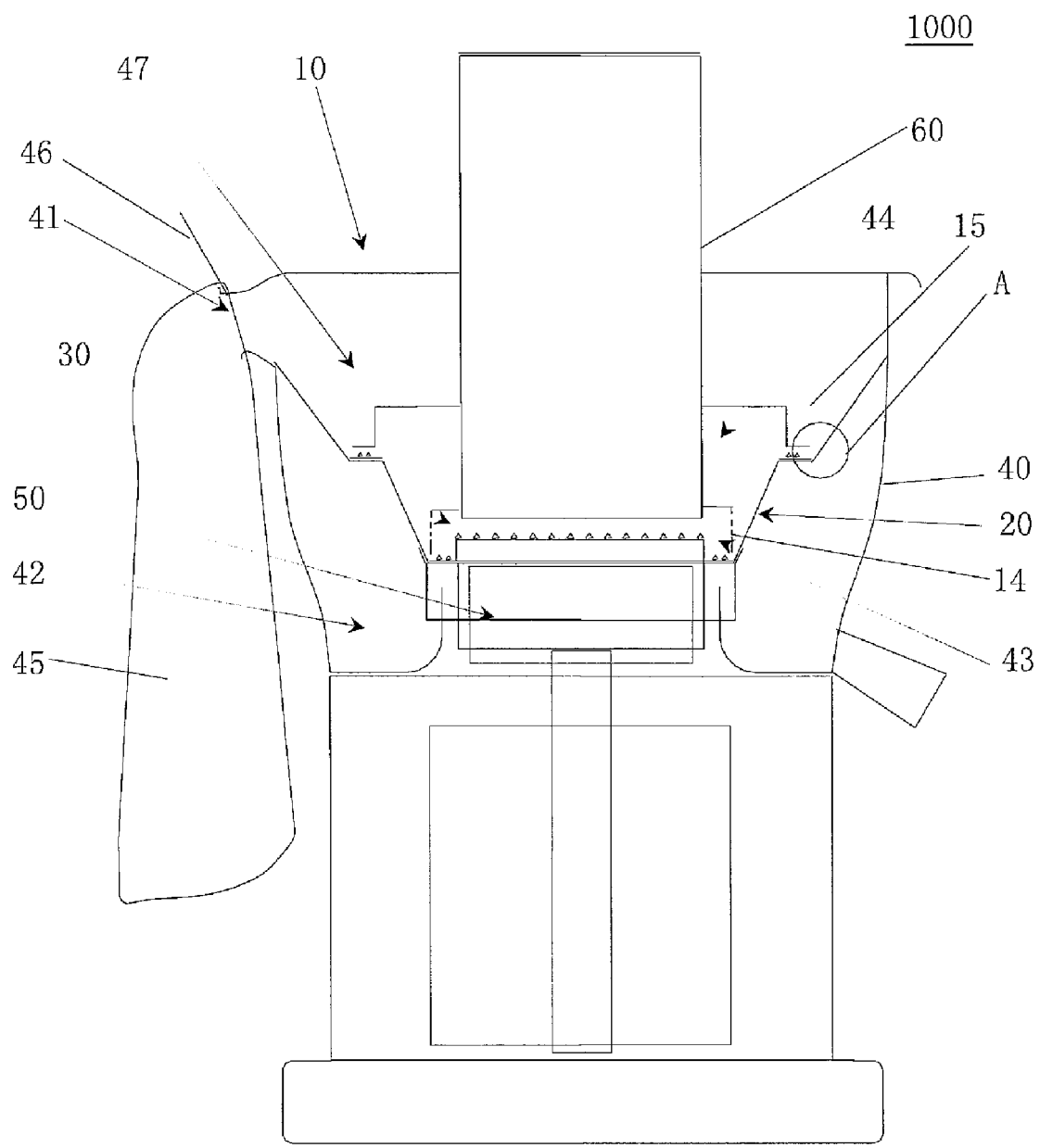
FIG. 1 is a schematic view of a juice extractor in accordance with an embodiment.

Throughout the drawings, the same reference numerals and characters, unless otherwise stated, are used to denote like features, elements, components or portions of the illustrated embodiments. Certain terminology is used in the following description for convenience only and is not limiting. The words "above," "below," "lower", "upper", etc. designate directions in the drawings to which reference is made. The words "inwardly" and "outwardly" refer to directions toward and away from, respectively, the geometric center of a juice extractor in accordance with the present invention, and designated parts thereof. The terminology includes the words noted above, derivatives thereof and words of similar import.

Figure 2:
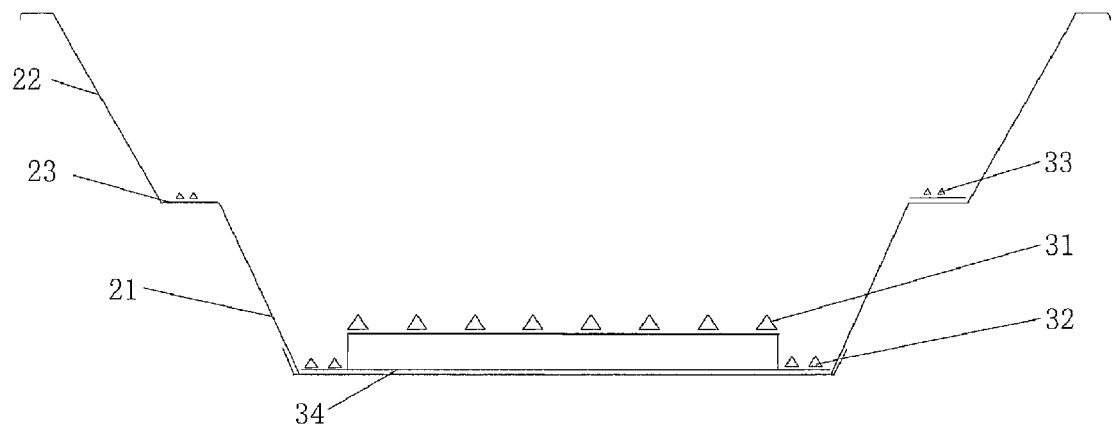
FIG. 2 is a schematic view of the filtering apparatus and the shattering apparatus of the juice extractor shown in FIG. 1.

According to a first embodiment, a juice extractor 1000 includes a body 40, a filtering apparatus 20 and a shattering apparatus 30, as shown in FIGS. 1 and 2. The internal wall of the body 40 defines an inner space, within which the filtering apparatus 20 and the shattering apparatus 30 reside. Referring to FIGS. 1 and 2, the filtering apparatus 20 divides the inner space into a shattering chamber 47 and a collecting chamber 42. The shattering apparatus 30 is disposed within the shattering chamber and comprises a first cutting blade 31 and a second cutting blade 32. Comestibles, such as fruits or vegetables, fed in the juice extractor are shattered by the first cutting blade firstly. The comestibles shattered by the first cutting blade can reach the second cutting blade and be shattered by the second cutting blade, as will be described in detail below.

Figure 3:
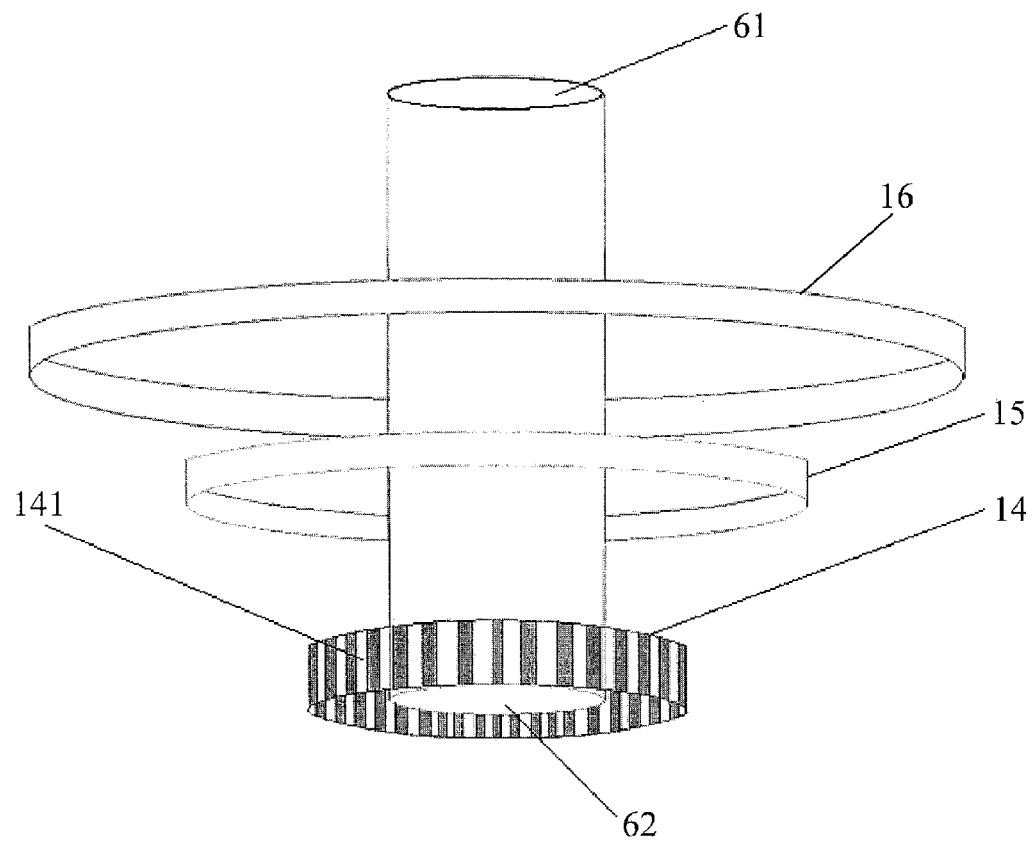
FIG. 3 is an enlarged view of a first lower cover, a second lower cover and a feeding tube in FIG. 1, viewed from another aspect.

The juice extractor 1000 may further include a cover assembly 10, a driving apparatus 50 adapted to driving the shattering apparatus 30, and a feeding tube 60 serving as an intake passage for the comestibles. As shown in FIGS. 1 and 3, the cover assembly 10 includes a first lower cover 14. When assembled, the first lower cover 14 is disposed in the body 40 and cooperates with the filtering apparatus 20 and shattering apparatus 30 to perform the extraction of the comestibles, as will be described in detail below. In a particular implementation, the cover assembly 10 further includes a top cover 16. The top cover 16 is provided for selective placement on an open top of the body 40 to generally enclose the interior of the body 40. When the juice extractor is assembled, the lower surface of the top cover 16 may be supported on the top edge of the body 40.

The feeding tube 60 extends down through the open top of the body 40 into the inner space. In a particular implementation, the cover assembly 10 is fixed on the feeding tube 60. As shown in FIGS. 1 and 3, the feeding tube 60 extends through the cover assembly 10 and generally centrally located with respect to the body 40 when the cover assembly 10 is engaged therewith. The top cover 16 can be integrated with the feeding tube 60. Alternatively, the top cover 16 can be formed separately from the feeding tube 60 and attached thereto in a conventional manner. Similarly, the first lower cover 14 may be formed integrally with or separately from the feeding tube 60. The feeding tube 60 may generally be perpendicular to the top surface of the top cover 16. The feeding tube 60 defines an intake 61 on the top and an outtake 62 at the bottom.

As mentioned above, the filtering apparatus 20 divides the inner space defined by the internal wall of the body 40 into a shattering chamber 47 and a collecting chamber 42. The shattering chamber 47 lies inwardly of the filtering apparatus 20, and the collecting chamber 42 lies outwardly of the filtering apparatus 20. The outtake 62 of the feeding tube 60 is communicated with the shattering chamber 47. The upper end of the filtering apparatus 20 abuts against the inner wall of the body 40 so as to inhibit the residue of the comestibles from entering into the collecting chamber 42. The filtering apparatus 20 comprises a first filter 21. The first filter 21 is configured in a top wide and bottom narrow shape along the feeding direction. The cross section of the first filter 21 may be in an annular shape.

Referring to FIGS. 1 and 2, the shattering apparatus 30 may comprise a first cutting blade 31, a second cutting blade 32 and a bottom seat 34. The first cutting blade 31 is arranged at a central part of the bottom seat 34. The second cutting blade 32 is arranged on the bottom seat 34 around the first cutting blade 31. In a particular implementation, the second cutting blade 32 may be arranged lower than the first cutting blade 31 in the feeding direction. In an alternative implementation, the second cutting blade 32 may be arranged upper than the first cutting blade 31. Referring to FIGS. 1 and 2, the first cutting blade 31 may be configured in a disk shape, and the second cutting blade 32 may be configured in an annular shape. In other implementations, the first and second cutting blades may be configured in different shapes in accordance with different requirements.

Each of the cutting blades has one or more cutting teeth, as shown in FIG. 2. The height of the teeth of the first cutting blade 31 may be greater than that of the second cutting blade 32. Such configurations of the first and second cutting blades 31 can expedite the feeding and shattering process of the comestible. After a first grinding performed by the first cutting blade 31, the comestibles become small fragments. Therefore, the height of the teeth of the second cutting blade 32 may be designed smaller than that of the first cutting blade 31 so as to cut the fragments of comestibles into tiny pieces.

When assembled, the first cutting blade 31 may be positioned right under the outtake 62 of the feeding tube 60, or slightly protruding into the feeding tube 60 through the outtake 62. In a particular implementation, the internal diameter of the feeding tube 60 is approximately the same as (or a little larger than) the maximum effective or useful diameter of the first cutting blade 31, and the axial center of the feeding tube 60 may generally be in registry with the axial center of the first cutting blade 31.

The shattering apparatus 30 mounted in the inner space of the body 40 is surrounded by the filtering apparatus 20. The juice extracted from the comestibles flows through the filtering apparatus 20. The filtering apparatus 20 is sandwiched between the shattering apparatus 30 and the internal wall of the body 40 such that the first and second cutting blades are exposed within the filtering apparatus 20 at the interior bottom section thereof. In a particular implementation, the bottom end of the frustoconically shaped filtering apparatus 20 is positioned on the bottom seat 34 and surrounds the outer periphery of the second cutting blade 32. The filtering apparatus 20 projects upwardly and outwardly from the bottom seat 34.

The shattering apparatus 30 is engaged with and driven by the driving apparatus 50 to rotate about a substantially vertical axis. The driving apparatus 50 may be one or more motors. Each of the motors may drive at least one of the first and second cutting blades. In a particular implementation, the filtering apparatus 20 is fixed on the bottom seat 34 and rotated together with the shattering apparatus 30 by the driving apparatus 50.

Figure 4:
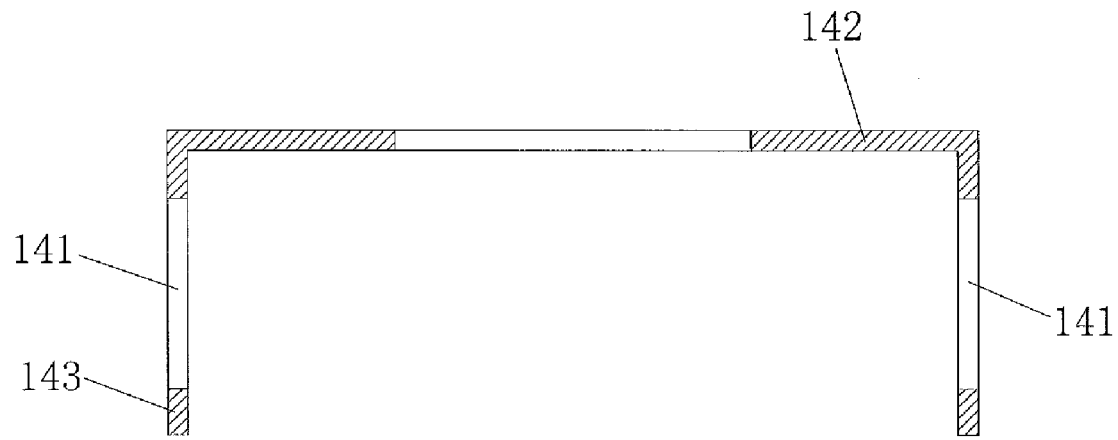
FIG. 4 is a section view of the first lower cover.

Referring to FIGS. 1 and 3, the first lower cover 14 may be fixed around the feeding tube 60 and disposed adjacent to the outtake 62 of the feeding tube 60. When assembled, the first lower cover 14 divides the shattering chamber 47 into a first shattering chamber 43 and a second shattering chamber 44. The first and second cutting blades 31 and 32 may be both contained in the first shattering chamber 43. The outtake 62 of the feeding tube 60 is communicated with the first shattering chamber 43. In a particular implementation, a lower edge of the first lower cover 14 is positioned between the filtering apparatus 20 and an inner periphery of the second cutting blade 32 in the horizontal direction, and a little higher than the second cutting blade 32 in the vertical direction. The lower edge of the first lower cover 14 may be disposed above the second cutting blade 32 with a suitable interval so that the tiny pieces of comestibles shattered by both the first and second cutting blades can pass through the interval and the fragments of comestibles only shattered by the first cutting blade will be retained in the first shattering chamber 43. In a particular implementation, the first lower cover 14 may have a plurality of apertures 141 defined therein. Each of the interval and the apertures may serve as a passage for the comestibles between the first shattering and the second shattering chamber 44. The plurality of apertures 141 defined in the first lower cover 14 render the fine shattered fragments processed by the second cutting blade 32 fly out timely, thereby expediting the juice extracting process. Referring to FIGS. 1 and 4, in an example, the first lower cover 14 may include an annular top panel 142 and a sidewall 143 extending downwardly and vertically from the outer edge of the top panel 142. The top panel 142 may be set around the feeding tube 60. The apertures 141 are defined in the sidewall 142. Each of the apertures 141 may be formed in a strip-like shape, and the plurality of apertures 141 may be proportionally distributed in the sidewall 142 around a rotating axis of the first cutting blade 31. Alternatively, there may be no aperture defined in the first lower cover 14. In this case, the first shattering chamber 43 is configured to communicate with the second shattering chamber 44 only through the interval formed between the lower edge of the first lower cover 14 and the second cutting blade 32, as described above.

Referring to FIG. 1, the juice extractor may further include a residue outtake 41 which is defined in the side wall of the body 40 and communicates with the shattering chamber 47 for discharging the residue of the extracted comestible. The residue outtake 41 is defined higher than an upper edge of the filtering apparatus 20. In a particular implementation, the residue outtake 41 lies in the top of the side wall of the body 40. A ledge may be formed around the residue outtake 41 and project outwardly from the body 40 for detachablely engaging with a residue collecting apparatus 45. The residue outtake 41 is equipped with an openable lid 46. When a small amount of comestibles such as fruits or vegetables are processed, the juice extraction can be performed by closing the lid 46, in no need of the residue collecting apparatus 45. The residue collecting apparatus 45 may be an ordinary environment-friendly bag.

The working process of the juice extractor according to the first embodiment will be described as below.

The comestibles such as fruits or vegetables are fed along the feeding tube 60 through the intake 61, falls down under the gravity to the outtake 62 of the feeding tube 60, and reaches the first cutting blade 31. The first cutting blade 31, rotated by the driving apparatus 50, grinds the comestibles through interaction of the cutting teeth of the first cutting blade 31 with the comestible. Since the teeth of the first cutting blade 31 are higher, the comestibles can be roughly shattered. The juice of the comestibles extracted during the first roughly shattering are thrown through the interval between the lower edge of the first lower cover 14 and the second cutting blade 15 and/or the apertures 141 defined in the first lower cover 14 under centrifugal effect and then through the first filter 21 to fall into the collecting chamber 42. Bulky fragments of the comestibles not being thrown through the interval and/or the apertures 141 fall on the second cutting blade 32, and are shattered for the second time. Since the height of teeth of the second cutting blade 32 is smaller than that of the first cutting blade 31, the bulky fragments are shattered fine. The juice extracted during the second shattering and the fine fragments are thrown through the interval and/or the apertures 141 to the second shattering chamber 44. Then the juice extracted fall into the collecting chamber 42 through the first filter 21. Residue of the fragments is thrown into the second shattering chamber 44 and discharged through the residue outtake 41. After being shattered two times, the juice in the comestibles is intensively extracted.

According to a second embodiment, the filtering apparatus 20 of the juice extractor may further comprise a second filter 22 and a connecting panel 23 connecting the first filter 21 and the second filter 22. As shown in FIGS. 1 and 2, the second filter 22 is positioned upper than the first filter 21 in a feeding direction. The second filter 22 is also configured in a frusto-conical shape which is top wide and bottom narrow along the feeding direction. The connecting panel 23 may be oriented in a horizontal plane or inclined relative to the horizontal plane. In addition, the shattering apparatus 30 may further include a third cutting blade 33. The third cutting blade 33 may be arranged on the connecting panel 23 of the filtering apparatus 20. The third cutting blade 33 has one or more cutting teeth, and the height of the teeth of the third cutting blade 33 is smaller than that of the first and second cutting blades 31 and 32. Similar to the first and second cutting blades, the third cutting blade 33 is also driven by the driving apparatus 50.

The cover assembly 10 may further include a second lower cover 15 which is arrange blow the top cover 16 and above the first lower cover 14 along the feeding direction. The second lower cover 15 may be fixed on the feeding tube 60. In a particular implementation, the second lower cover 15 is formed integrally with the feeding tube 60. Alternatively, the second lower cover 15 can be formed separately from the feeding tube 60 and attached thereto in a conventional manner.

Figure 6:
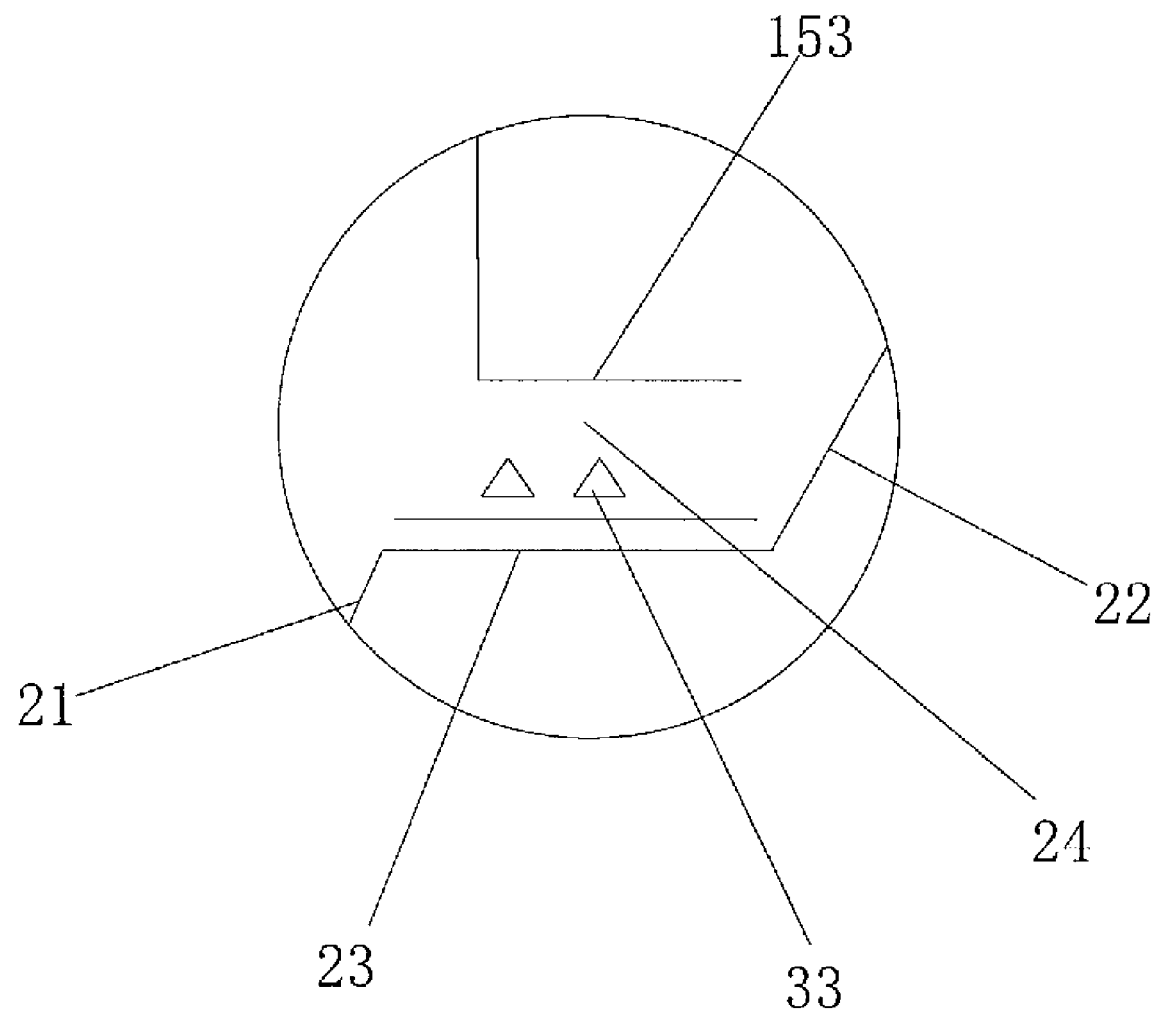
FIG. 6 is an enlarged view of the region A in FIG. 1.

When assembled, a lower edge of the second lower cover 15 is arranged right above the third cutting blade 33 such that a passage 24 is formed therebetween, as shown in FIG. 6. According to the present embodiment, the comestibles such as fruits and vegetables, after shattered by the first and second cutting blades 31, 32, will pass through the passage 24 under centrifugal effect, and be further shattered by the third cutting blade 33. As mentioned above, after the grinding by the first and second cutting blades 31, 32, the comestible fragments become tiny. Therefore, the height of the teeth of the third cutting blade 33 may be designed smaller than that of the second cutting blade 32.

Figure 5:
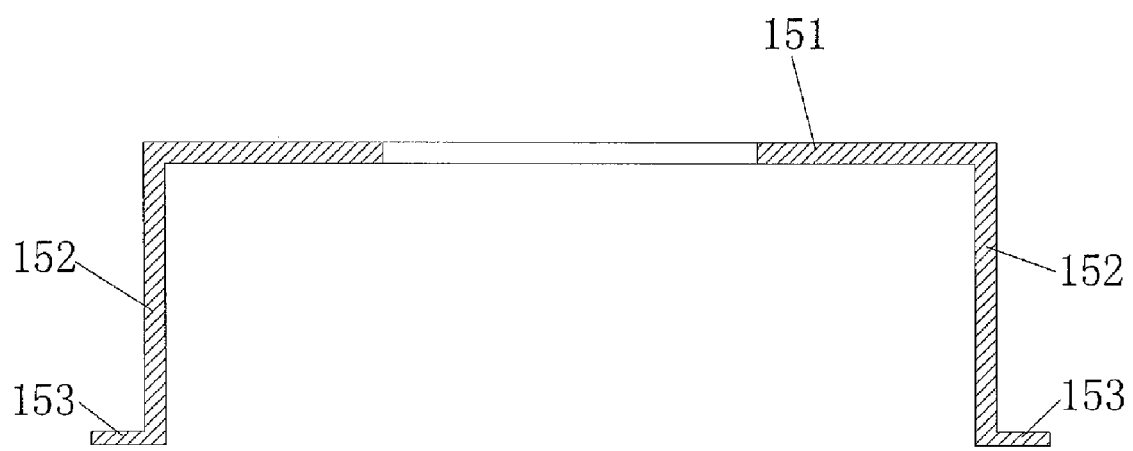
FIG. 5 is a section view of the second lower cover.

In a particular implementation, the second lower cover 15 may include an annular outer lip 153 which is extended outwardly from a lower edge of the second lower cover 15 in a horizontal direction. When assembled, the annular outer lip 153 may be arranged right above the third cutting blade 33. The passage 24 is formed between the outer lip 153 and the third cutting blade 33. The width of the outer lip 153 may be the same with that of the third cutting blade 33. The outer edge of the outer lip 153 may be aligned with the outer edge of the third cutting blade 33, and the inner edge of the outer lip 153 may be aligned with the inner edge of the third cutting blade 33. Alternatively, the width of the outer lip 153 may be greater or less than that of the third cutting blade 33, and the outer and/or inner edge of the outer lip 153 may not be aligned with those of the third cutting blade 33. Referring to FIG. 5, the second lower cover 15 may further include an annular top plate 151 and a side rim 152 extending downwardly and vertically from the outer edge of the top plate 151. The top plate 151 can be fixed around the feeding tube 60. The annular outer lip 153 is extended from a bottom edge of the side rim 152. In an alternative implementation, the second lower cover may have no outer lip, and instead, the passage for further shattering the comestibles may be defined between the bottom of the side rim 152 and the third cutting blade 33. Alternatively, the second lower cover 15 may include a top plate only. The passage 24 may be formed between the lower surface of the top plate and the third cutting blade 33.

The first and second lower cover 14, 15 may be made of plastic, stainless steel or some else hardware materials. The thickness of the second lower cover 15 may be at least of 0.1 mm. Alternatively, the first and second lower cover may be made of other materials or have less thickness due to the property of the material selected.

In most other respects, the juice extractor of the second embodiment is substantially similar to that of the first embodiment and, thus, is not described in further detail herein.

The working process of the juice extractor according to the second embodiment will be described as below.

The comestibles such as fruits or vegetables are fed along the feeding tube 60 through the intake 61. After the first and second grinding performed by the first and second cutting blade, the fine fragments of the comestibles without complete juice extraction, which are thrown into the second shattering chamber 44, are blocked by the second lower cover 15. The first and second grinding processes are identical to those described above according to the first embodiment so that detailed explanation thereof is omitted.

The fine fragments in the second shattering chamber 44 will passes through the passage 24 defining between the second lower cover and the third cutting blade 33 under centrifugal effect, and will be shattered for the third time. Since the height of the teeth of the third cutting blade 33 is smaller than that of the first or second cutting blade, the fragments are superfine shattered. The superfine shattered fragments are thrown to the second filter 22 to separate the juice to the collecting chamber 42. Residue of the fragments is discharged through the residue outtake 41. After being shattered three times, the residue of the comestibles are dried out, and the juice in the comestibles is intensively extracted.

According to a third embodiment, the shattering apparatus 30 may include the first cutting blade 31 and the third cutting blade 33 only. In this case, the comestibles fed from the feeding tube 60 are shattered by the first cutting blade 31 and then thrown through the passage 24 for being shattered by the third cutting blade 33 for the second time. In this embodiment, the first lower cover 14 may be omitted.

In most other respects, the juice extractor of the third embodiment is substantially similar to that of the second embodiment so that a detailed description thereof will not be provided.

According to the embodiments or implementations described herein, by extracted for two or three times, the juice in the comestibles will be intensively extracted so as to improve the juice extracting rate and reduce the juice contained in the residue. The residue finally resulted are dried out, and can be encased in an ordinary environmental protection bag. Therefore, special designed residue encasing is no longer needed, which results in space and cost saving. In addition, when the amount of the comestibles to be processed is small, the lid 46 can be closed on the residue outtake 41, therefore the juice extraction process could be carried out conveniently. The first, second and third cutting blades may be driven by the driving apparatus 50 at the same time, so that the first, second and third shattering process can be carried out simultaneously, which results in time saving.

Other embodiments or implementations are possible. For example, the juice extractor disclosed herein can also be used as grinding machine, by altering cutting blades and covers thereof. The grinding machine can be used to grind soybeans, coffee beans, pip, peanut, mung bean, rice etc. In the grinding process, the grinding objects can be fed through the feeding tube, and grinded by the first, the second and/or the third cutting blades, respectively, to obtain fine powder.

While the present invention has been illustrated by the above description and embodiments or implementations, it is not intended to restrict or in any way limit the scope of the appended claims thereto.

What is claimed is:

1. A juice extractor, comprising:
   a body having an inner space;
   a filtering apparatus disposed within the inner space and defining a shattering chamber therein;
   a shattering apparatus disposed within the shattering chamber and comprising a first cutting blade and a second cutting blade configured to shatter comestibles, wherein the comestibles shattered by the first cutting blade can reach the second cutting blade and be shattered by the second cutting blade; and
   a cover assembly which includes a first lower cover disposed above the first and second cutting blades, wherein the first lower cover divides the shattering chamber into a first shattering chamber and a second shattering chamber and encloses the first and second cutting blades in the first shattering chamber,
   wherein a plurality of apertures are defined in the first lower cover, through which the comestibles shattered by the first and second cutting blades can pass to the second shattering chamber from the first shattering chamber.

2. The juice extractor of claim 1, wherein the second cutting blade is arranged lower than the first cutting blade along a feeding direction of the comestibles.

3. The juice extractor of claim 1, wherein the second cutting blade is arranged higher than the first cutting blade along a feeding direction of the comestibles.

4. The juice extractor of claim 1, wherein each of the first and second cutting blades has one or more cutting teeth, and the height of the teeth of the first cutting blade is greater than that of the second cutting blade.

5. The juice extractor of claim 1, wherein the plurality of apertures are proportionally distributed in a sidewall of the first lower cover around a rotating axis of the first cutting blade.

6. The juice extractor of claim 1, wherein an interval are provided between a lower edge of the first lower cover and the second cutting blade, through which the comestibles shattered by the first and second cutting blades can pass to the second shattering chamber from the first shattering chamber.

7. The juice extractor of claim 1, further comprising a feeding tube for delivering the comestibles to be extracted to the shattering apparatus, wherein the feeding tube is communicated with the first shattering chamber and positioned right above the first cutting blade.

8. The juice extractor of claim 1, further comprising a residue outtake defined within the body, wherein the residue outtake can be detachably engaged with a residue collecting apparatus.

9. The juice extractor of claim 1, wherein the second cutting blade is arranged around the first cutting blade.

10. The juice extractor of claim 1, wherein the filtering apparatus comprises a first filter, a second filter arranged upper than the first filter in a feeding direction of the comestible, and a connecting panel connecting the first filter and the second filter.

11. The juice extractor of claim 1, wherein the shattering apparatus further comprises a third cutting blade disposed on the connecting panel for further shattering the comestibles shattered by the first and second cutting blades.

12. The juice extractor of claim 1, wherein the cover assembly further includes a second lower cover which is positioned higher than the first lower cover in the feeding direction and disposed above the third cutting blade, thereby defining a passage between the second lower cover and the third cutting blade, through which the comestibles shattered by the first and second cutting blades can pass.

13. A juice extractor, comprising:
   a body having an inner space;
   a filtering apparatus disposed within the inner space and defining a shattering chamber therein;
   a shattering apparatus disposed within the shattering chamber and comprising a first cutting blade and a second cutting blade configured to shatter comestibles, wherein the comestibles shattered by the first cutting blade can reach the second cutting blade and be shattered by the second cutting blade;
   a cover assembly which includes a first lower cover disposed above the first and second cutting blades, wherein the first lower cover divides the shattering chamber into a first shattering chamber and a second shattering chamber and encloses the first and second cutting blades in the first shattering chamber; and
   a feeding tube for delivering the comestibles to be extracted to the shattering apparatus, wherein the feeding tube is communicated with the first shattering chamber and positioned right above the first cutting blade,
   wherein the first lower cover is fixed on the feeding tube.

14. The juice extractor of claims 13, wherein the filtering apparatus comprises a first filter, a second filter arranged upper than the first filter in a feeding direction of the comestible, and a connecting panel connecting the first filter and the second filter.

15. The juice extractor of claim 14, wherein the shattering apparatus further comprises a third cutting blade disposed on the connecting panel for further shattering the comestibles shattered by the first and second cutting blades.

16. The juice extractor of claim 15, wherein the cover assembly further includes a second lower cover which is positioned higher than the first lower cover in the feeding direction and disposed above the third cutting blade, thereby defining a passage between the second lower cover and the third cutting blade, through which the comestibles shattered by the first and second cutting blades can pass.

17. A juice extractor, comprising:
   a body having an inner space;
   a filtering apparatus disposed within the inner space and defining a shattering chamber therein;
   a shattering apparatus disposed within the shattering chamber and comprising a first cutting blade and a second cutting blade configured to shatter comestibles, wherein the comestibles shattered by the first cutting blade can reach the second cutting blade and be shattered by the second cutting blade;
   a cover assembly which includes a first lower cover disposed above the first and second cutting blades, wherein the first lower cover divides the shattering chamber into a first shattering chamber and a second shattering chamber and encloses the first and second cutting blades in the first shattering chamber; and a feeding tube for delivering the comestibles to be extracted to the shattering apparatus, wherein the feeding tube is communicated with the first shattering chamber and positioned right above the first cutting blade, wherein the filtering apparatus comprises a first filter, a second filter arranged upper than the first filter in a feeding direction of the comestible, and a connecting panel connecting the first filter and the second filter;

wherein the shattering apparatus further comprises a third cutting blade disposed on the connecting panel for further shattering the comestibles shattered by the first and second cutting blades;

wherein the cover assembly further includes a second lower cover which is positioned higher than the first lower cover in the feeding direction and disposed above the third cutting blade, thereby defining a passage between the second lower cover and the third cutting blade, through which the comestibles shattered by the first and second cutting blades can pass; and wherein the second lower cover is fixed around the feeding tube.

18. The juice extractor of claim 17, wherein an outer lip is extended from the lower edge of the top plate in a horizontal direction, the passage being formed between the outer lip and the third cutting blade.

19. The juice extractor of claim 18, wherein the outer lip has an outer edge aligned with an outer edge of the third cutting blade, and/or has an inner edge aligned with an inner edge of the third cutting blade.

20. The juice extractor of claim 15, wherein the third cutting blade has one or more cutting teeth, and the height of the teeth of the second cutting blade is smaller than that of the first cutting blade and greater than that of the third cutting blade.

* * * * *